United States Patent [19]

Comley

[11] 3,721,855

[45] March 20, 1973

[54] DISPLAY GENERATING MEANS CREATING ISOMETRIC PROJECTIONS OF A FAMILY OF CURVES

[75] Inventor: William Comley, Los Angeles, Calif.

[73] Assignee: McDonnell Douglas Corporation, Santa Monica, Calif.

[22] Filed: Aug. 13, 1970

[21] Appl. No.: 63,361

[52] U.S. Cl. ..................315/22, 235/198, 340/324 A
[51] Int. Cl. ..........................................H01j 29/70
[58] Field of Search .....................235/197–198, 151; 315/18, 19, 22, 24, 324 AD; 340/324 A

[56] References Cited

UNITED STATES PATENTS 3,614,521 10/1971 Brueschke.............................315/18
3,115,605 12/1963 Coulter.................................315/22 X

*Primary Examiner*—Carl D. Quarforth
*Assistant Examiner*—J. M. Potenza
*Attorney*—Walter J. Jason, Donald L. Royer and George W. Finch

[57] ABSTRACT

Means for extending the ability of an analog or hybrid computer which allow solution of problems, and various predetermined displays of the solutions as functions of additional independent variables of the operator's choice. The means include a staircase generator for varying an independent variable for each computation of the problem and peak and level sensing circuits so that a three-dimensional surface representing the solution to the problem may be displayed as a family of curves, as an isometric projection, as a cross-plot of a time history, as a cross-plot of positive or negative peaks, and as a conformal map.

13 Claims, 10 Drawing Figures

INVENTOR.
WILLIAM COMLEY JR.
BY
George W. Finch
- Attorney -

INVENTOR.
WILLIAM COMLEY JR.
BY
George W. Finch
-Attorney-

INVENTOR.
WILLIAM COMLEY JR.
BY
George W. Finch
Attorney

INVENTOR.
WILLIAM COMLEY JR.
BY George W. Finch
- Attorney -

INVENTOR.
WILLIAM COMLEY JR.
BY
George W. Finch
Attorney

DISPLAY GENERATING MEANS CREATING ISOMETRIC PROJECTIONS OF A FAMILY OF CURVES

BACKGROUND OF THE INVENTION

Present day analog and analog-digital hybrid computers possess an abundant capacity for high speed repetitive operation. Suitable readout devices to take full advantage of this high speed repetitive operation have been conspicuously absent however since generally speaking the presently available display devices can only provide *x* versus *y* multi-time history plotting.

SUMMARY OF THE INVENTION

The present invention expands the usefulness of computers having the aforementioned repetitive modes by enabling more complex computer solutions and the display of such solutions. The present invention has the unique feature of generating within itself a parameter controlling staircase function. This function is fed to the computer causing it to generate solutions of an additional independent variable of the operator's choice. When the parameter controlling function is fed to the computer as an additional input, the output thereof acquires an additional dimension, that is, what is displayed is a surface rather than a plane curve. At the operator's option a variety of displays may be selected by push button control. For example, in addition to the displays normally obtainable with standard display devices, the present means enable the generation and display of repetitive solutions as a function not only of time, but of at least one other additional independent variable. The resulting solutions have an additional dimension which may be displayed in any of several modes of the operator's choice. These display modes include: a family of curves, an isometric projection of the surface of the function, cross-plots at any time during time histories, cross-plots of maximus or minimus, and conformal mapping of the surface.

At the heart of the present display generating means is a staircase generator. This staircase generator normally generates outputs which are fed to the computer as predetermined levels of voltage which can represent an independent variable. The computer uses these voltage levels to establish new values of the independent variable on each subsequent recomputation of the solution to the problem. In addition to the staircase generator, the display means also include: means for sensing the maximum or minimum of each repetitive solution of the computer for use in displaying cross-plots of maximus or minimus; level sensing means which act as triggers when the computer output is at predeterminable adjustable levels for use in conformal mapping; and track and store means which include switching means which allow display of the computer output only at a predeterminable time during each of the repetitive solutions to enable the display of cross-plots during time histories. The present display means also include axis generation means, axis shift means for use when generating isometric projections, and numerous other features as will be described.

It is therefore an object of the present invention to provide a convenient and flexible readout device for high speed repetitive analog and hybrid computer systems.

Another object is to provide means for upgrading presently available and/or installed computer systems at a cost which is low with respect to the cost of replacement thereof.

Another object is to provide an accessory device for upgrading computers which is relatively easy to understand and operate.

Another object is to provide means for generating displays of problem solutions which heretofore have not been available.

These and other objects and advantages of the present invention will become apparent after considering the following detailed specification which covers preferred embodiments thereof in connection with the accompanying drawings, wherein:

DESCRIPTION OF THE SHOWN EMBODIMENTS

Figure 1:
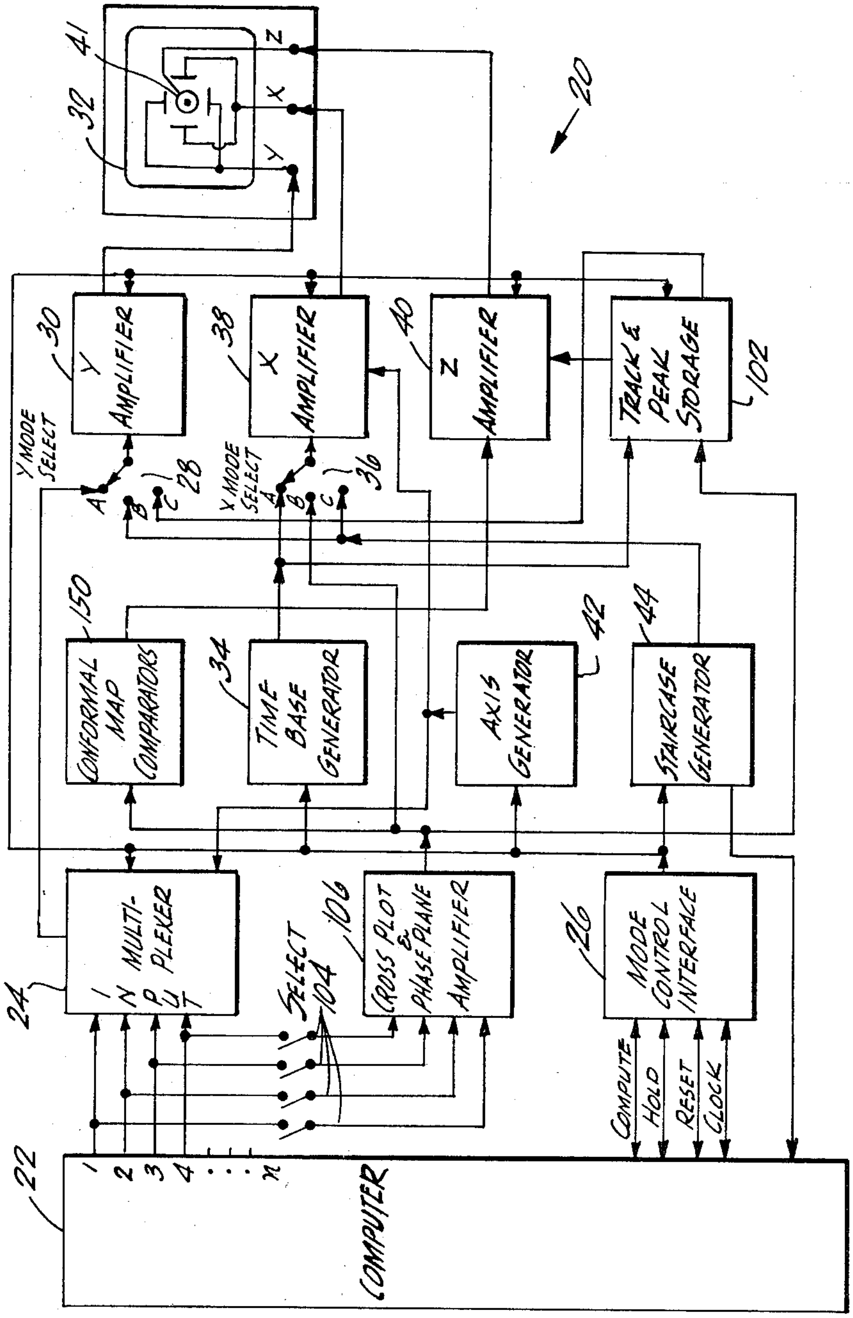
FIG. 1 is a block diagram of display generating means constructed according to the present invention.

Referring to the drawings more particularly by reference number, number 20 in FIG. 1 refers to the display means of the present invention interconnected with a computer 22. The computer 22 can be an analog computer or it can be the analog portion of a hybrid computer. Computers such as computer 22 can have multiple outputs for the various derivatives of the solution of the problem programmed therein so that it is possible to quickly switch from one output to another. These multiple outputs are shown by terminals 1, 2, 3, 4 . . . *n* on the computer 22. The outputs from the computer are fed as shown to an input multiplexer 24 of the display means 20. The display means 20 are also connected to the computer 22 through a mode control interface 26 which supplies all necessary synchronizing functions to the display means 20. When a display is desired, the computer 22 is activated causing it to compute the solutions to the problem programmed therein. These solutions are then passed to the input multiplexer 24 by means of the output terminals of the computer 22.

If it is desired to display the computer solutions in a conventional time history display, the output of the multiplexer 24 is fed through terminal A of a *y* mode select switch 28 to a *y* axis amplifier 30, which scales the multiplexer output and feeds it to the *y* axis of a display device shown as a cathode ray tube (CRT) 32. When the computer is activated, a control signal is transmitted from the mode control interface 26 to a time base generator 34 which is thereby caused to produce a ramp output signal. The ramp signal is fed through terminal A of a *x* mode select switch 36 to the *x* axis amplifier 38. The *x* axis amplifier 38 scales the ramp signal from the time base generator 34 and applies it to the *x* axis of the CRT 32. The mode control interface 26 also causes a signal to be sent to a *z* axis amplifier 40 during the computer solution. The *z* axis amplifier 40 responds thereto by sending an energizing signal to the *z* axis input of the CRT 32. The energizing signal activates the electron gun 41 in the CRT 32 so that the computer solution appears on the face of the CRT 32 in a conventional time history display. A conventional *x* versus *y* display is achieved by moving the *x* mode select switch 36 to the B position where it can conduct the *x* variable present on one of the computer outputs to the *x* axis of the CRT 32.

The display means 20 also include an axis generator 42 which through proper control by the mode control interface 26 can be energized to produce axes on the face of the CRT 32 at predetermined locations. The axis generator 42 accomplishes this by feeding a ramp signal to the *y* axis amplifier 30 during the first hold period of each compute cycle of the computer 22 and to the *x* axis amplifier 38 during the second hold period to produce *y* and *x* axes respectively on the face of the CRT 32. The hold periods are shown with reference to other computer functions in the timing chart of FIG. 2.

Figure 6:
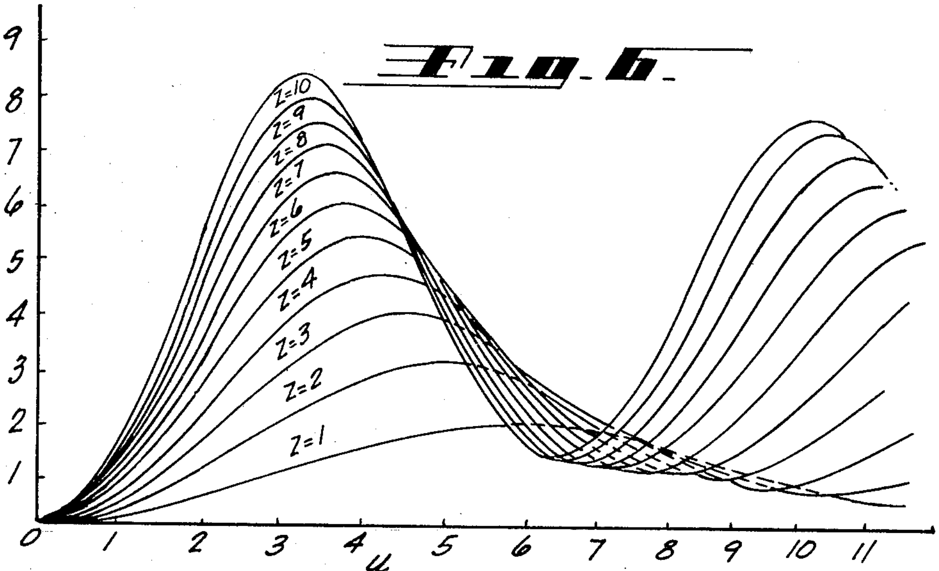
FIGS. 6 through 10 are examples of a function being displayed by the various special modes available in the present display means with FIG. 6 being a family of curves, FIG. 7 an isometric projection of the surface of the function, FIG. 8 a cross-plot of the function at a given time, FIG. 9 a cross-plot of a maximus of the function, and FIG. 10 a conformal map of the surface of the function.

If one of the unique displays which are available with the present display means 20 is desired, it can be obtained through proper control of the *y* mode select switch 28 and the *x* mode select switch 36. For example, when a family of curves such as is shown in FIG. 6 is desired, the *y* mode select switch 28 and the *x* mode select switch 36 are both placed in the A positions. The mode control interface 26 is then allowed to energize a staircase generator 44, the circuit schematic of which is shown in FIG. 3.

Figure 2:
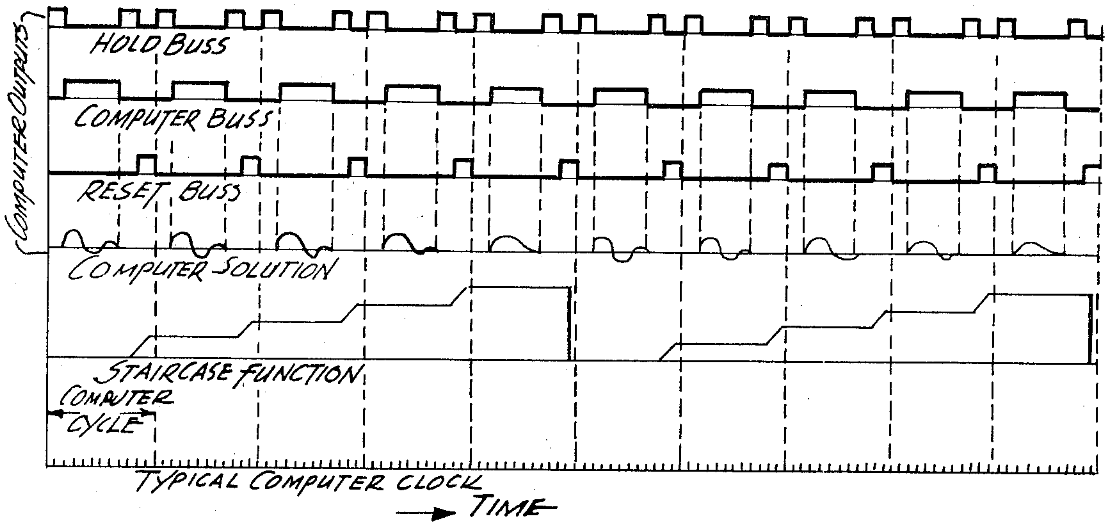
FIG. 2 is a typical timing chart for the display means of FIG. 1.
Figure 3:
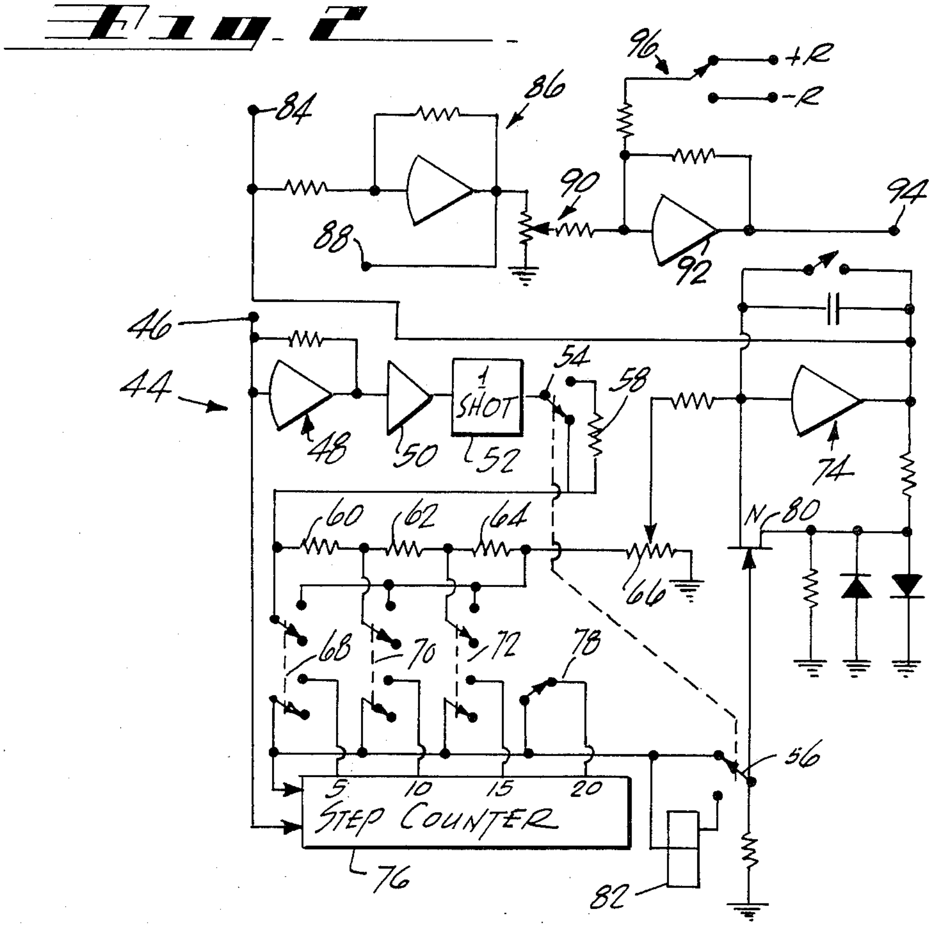
FIG. 3 is a schematic circuit diagram of the staircase generator of FIG. 1.

The staircase generator 44 as shown in FIG. 3, is an integrator type staircase generator which is connected to receive inputs from the reset buss of the computer 22 through the mode control interface 26. The signal on the reset buss of the computer 22 is shown in FIG. 2 with respect to other computer mode control outputs including the output of the hold buss, the output on the compute buss, the computer solution output and the output of a typical computer clock. The staircase generator 44 integrates the input pulses from the reset buss to produce the staircase function shown in FIG. 2. Although the staircase function shown is a five level staircase, the number of steps generated can be adjusted as will be shown hereinafter.

The staircase generator 44 receives the input pulses from the reset buss on terminal 46 which input pulses are fed through an inverter circuit 48 which may or may not be required depending on the polarity of the pulses from the reset buss. The inverted reset pulses are then fed through an amplifier 50 to a one shot circuit 52 which produces a single output pulse of a predetermined length upon receipt of each input pulse from the reset buss. The one shot 52 enables the staircase generator 44 to operate relatively independently of the length of the reset buss pulses so that the display means 20 can be used with computers having a wide range of reset pulse widths without modification.

The output pulses of the one shot 52 are fed through a switch 54 which is mechanically ganged to another switch 56. The switches 54 and 56 are used in a circuit to double the steps in the output staircase function generated by the staircase generator 44 as will be explained. Depending on the position of switch 54 the pulses from the one shot 52 are fed either directly or through a level reducing resistor 58 to a voltage divider network made up of resistors 60, 62, 64 and a variable resistor 66 which like resistor 58 are also used to reduce the level of the one shot output. The level reducing resistors 60, 62 and 64 are switched in and out of the circuit by switches 68, 70 and 72. The switches 68, 70 and 72 therefore control the level of the output pulses from the one shot 52 which are fed through the variable resistor 66 to an integrator 74. The integrator 74 integrates the pulses to form the staircase function desired.

The switches 68, 70 and 72 also control the operation of a step counter 76 to which the input pulses from the reset buss are also fed. The step counter 76 produces outputs on the terminals labeled 5, 10, 15 and 20 in FIG. 3 when it has received that number of input pulses from the reset buss. These outputs from the step counter 76 are routed by the switches 68, 70 and 72 and another switch 78, so that when the desired number of input pulses from the reset buss has been received by the step counter 76, a signal therefrom is fed back to a reset input of the step counter 76 to reset the count within the step counter 76 to zero. With the switches 68, 70, 72 and 78 in the positions shown, 20 pulses from the reset buss are required to reset the step counter 76 to zero.

The output signal from the step counter 76 also passes through the switch 56 to the gate electrode of a field effect transistor (FET) 80. The FET 80 is connected across the integrator 74 so that it resets the integrator 74 to return its output to zero whenever the FET 80 receives the output signal from the step counter 76 at its gate electrode. As aforesaid the switches 68, 70 and 72 cause the level of the output pulses of the one shot 52 fed to the integrator 74 to be lowered when they increase the number of pulses required to cause a step counter output. The switches thereby assure that the integrator 74 is restricted to operation within its linear operating range no matter how many steps are to be generated by the staircase generator 44.

If twice the number of steps in the staircase function are desired, then the switches 54 and 56 are moved to positions which are opposite from those shown in FIG. 3. This causes the resistor 58 to half the level of the one shot output so that each discrete step of the integrator 74 will be reduced by a factor of 2. The switch 56 thereafter no longer conducts the output signal from the step counter 76 directly to the gate electrode of the FET 80 but instead it connects the gate electrode to a J K flipflop 82 to which the counter output signal is applied. The J K flipflop 82 is connected so that two output signals must be received from the step counter 76 before a signal is fed through switch 56 to the gate electrode of the FET 80 to reset the integrator 74. Thus the number of steps in the staircase function output of the integrator 74 is effectively doubled while the change between discrete levels therein is cut in half.

Although the staircase generator 44 shown is an integrating type, many other types of staircase generators are possible including the use of analog-digital converters. These converters use the reset buss pulses or for that matter any recurring output signal of the computer to drive a ring counter circuit which switches resistors in and out of a voltage divider network in a predetermined fashion so that the output taken across the voltage divider network is a staircase function. By varying the resistances of the resistors in the voltage divider network non-linear staircase functions can even be produced.

The staircase output from the integrator 74 is fed through an output terminal 84 to terminal C of the $x$ mode select switch 36 and through an inverter circuit 86 to terminal 88 which connects the inverted staircase output thereof to terminal B on the $y$ mode select switch 28. The inverted staircase output of the inverter 86 is also fed through a step-gain reduction circuit 90, a summing and inverting amplifier 92 and terminal 94 back to the computer 22 to provide the aforesaid independent variable control voltage thereto. As can be seen in FIG. 3 the summing and inverting amplifier 92 also includes an input circuit 96 for biasing the level of the staircase function fed to the computer 22 as desired.

Referring again to the timing chart of FIG. 2, it can be seen that the staircase function output of the staircase generator 44 increases during a portion of the time that the reset pulse is on the reset buss. This increase is due to the integration of the output of the one shot 52 which is energized by the reset pulse as aforesaid. The output of the staircase generator 44 then remains at the level it attained during the preceding pulse on the reset buss until the next reset pulse during which time the output of the staircase generator 44 is raised even further. This continues until the step counter 76 causes the integrator 74 to be reset. Since, as can be seen in FIG. 2, the staircase function output from the staircase generator 44 is at a predeterminable but different constant level during each period that the computer 22 is computing a solution, the staircase function can be used to vary the parameters of the problem equation so the computer 22 produces a different solution during each step of the staircase function. Typical solutions of this sort are shown in FIG. 2 and labeled "computer solutions".

The computer solution as generated above when displayed on the CRT 32 takes the form of a family of curves as shown in FIG. 6. The solution displayed in FIG. 6 is generated on the CRT 32 when the step counter 76 is set to produce ten discrete steps in the integrator 74. The curves are labeled $z=1$ through $z=10$ to show the correlation between the steps and the curves.

Figure 7:
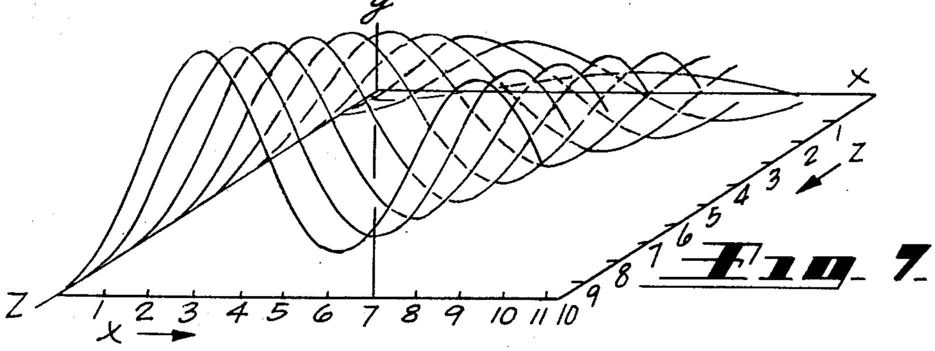

The same function, displayed as a family of curves in FIG. 6, can also be displayed in pseudo-isometric form as shown in FIG. 7. This is done by switching the $y$ mode select switch 28 into the A and B positions and the $x$ mode select switch 36 into the A and C positions so that the staircase output of the staircase generator 44 is also fed directly to the $y$ and $x$ axis amplifiers 30 and 38 to cause a predetermined skewing or offsetting of succeeding computer solutions fed to the CRT 32. The CRT 32, because of the skewing effect of the staircase generator 44, displays each successive computer solution downwardly and to the left with the intersection between the generated $y$ and $x$ axes producing an $z$ axis as shown in FIG. 7. The result is that the family of curves of FIG. 6 is drawn in isometric fashion. The angle of the isometric view can be changed by varying the proportion of the staircase generator output fed to the $y$ and $x$ amplifiers 30 and 38 respectively, as should be immediately obvious.

Figure 8:
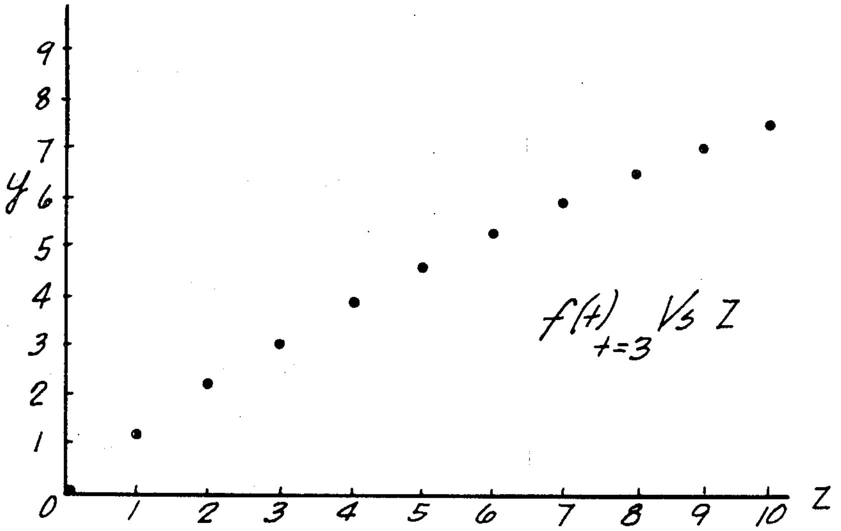

If a cross-plot at a given time such as $F(t)_{t=3}$ vs. $z$ as shown in FIG. 8 is desired, the $y$ mode select switch 28 is placed in the C position where it conducts inputs from track and peak storage means 102 to the $y$ axis amplifier 30. The track and peak storage means 102 receive inputs from the computer 22 through selection switches 104 and a cross-plot and phase plane amplifier 106 connected as shown. The track and peak storage means 102 are shown in greater detail in FIG. 4.

When a cross-plot at a desired point in time is desired, the succeeding computer solutions are fed through terminal 108 to a track and store portion 109 of the track and peak storage means 102. The solutions pass through a resistor 110 and a normally conducting FET 111 to an amplifier 112. A resistor 113 is connected from the output of the amplifier 112 to the input of the FET 111 and a capacitor 114 is connected from the output to the input of the amplifier 112. The amplifier 112 when so connected is an inverting amplifier whose gain is equal to $R_{113}/R_{110}$ so that the output of the amplifier 112 "tracks" the input computer solutions. When each computer solution reaches the desired point in time, a negative step signal generated by a comparator circuit 115 described hereinafter, is applied to the gate electrode of the FET 111 which step signal causes the FET 111 to go into a nonconducting condition. The charge on the capacitor 114 thereafter supplies the only input to the amplifier 112. Therefore, the output of the amplifier 112 remains at a constant level at the output voltage established at the instant the FET 111 ceases to conduct. This voltage level is held until the FET 111 is switched to a conducting condition by the comparator circuit 115.

The comparator circuit 115 includes a high gain amplifier 116 with a diode 117 connected thereacross. A positive ramp signal from the time base generator 34 is fed to the input of the amplifier 116 by means of terminal 118 and a negative adjustable bias signal is also supplied to the input thereof by means of terminal 119 and a variable resistor 120. As long as the negative bias signal is greater in magnitude than the instantaneous magnitude of the ramp signal, the comparator circuit 115 has no output. When, on the other hand, the ramp signal exceeds the bias signal, the comparator circuit produces the negative step output to cause the FET 111 to which it is fed to cease conducting. The output step signal of the comparator 115 is also connected to the $z$ axis amplifier 40 by means of terminal 121 to energize the electron gun in the CRT 32. The output signal of the comparator 115 ceases when the output ramp signal of the time base generator 34 is reset for the next compute cycle.

The output signal from amplifier 112 is inverted by an inverter 122 and is fed by means of terminal 123 to the C connection of the $y$ mode select switch 28. The $x$ axis amplifier 38 is connected to the staircase generator 44 through connection C of the $x$ mode select switch 36 thereby providing a staircase horizontal sweep. Since the electron gun 41 of the CRT 32 is energized by the comparator circuit 115 during each computer solution after the signal fed to the $y$ axis is fixed at the desired level, a series of dots representing the cross-plot $f(t)_{t=n}$ vs. $z$ where $n$ is set by the variable resistor 120 in the comparator circuit 115, is displayed on the CRT 32.

If, on the other hand, a display of $f(t)_{max}$ vs. $z$ is desired, the computer solution signal fed to the track and storage means 102 at terminal 108 is fed to a peak memory circuit portion 124 thereof. The computer solutions are fed from the terminal 108 to a switch 125 which switches an inverter amplifier 126 in or out of the circuit 124 so that the operator can select respectively either the positive or negative peak signal, that is, either the maximum or minimum, for display by merely moving the switch 125. At the same time the compute signal from the compute buss is fed by means of terminal 127 to the gate electrodes of FET's 128 and 129 to cause the FET's 128 and 129 to go into a nonconducting condition. The circuit 124 includes in addition to the inverter amplifier 126, three other serially connected amplifiers 130, 131 and 132. The FET's 128 and 129 are connected in shunt across amplifiers 130 and 131 respectively, so that the compute signal must be applied thereto before the amplifiers 130 and 131 can operate. The compute signal therefore enables the circuit 124.

When an increasingly negative computer solution is applied to the input of the amplifier 130 which is a high gain amplifier, the solution is momentarily amplified by a factor of 50 or more. The amplified output signal from amplifier 130 passes through a diode 133, oriented as shown, to the input of the amplifier 131. Amplifier 131 has a capacitor 134, 135 or 136 connected thereacross by a switch 137 which causes the amplifier 131 to very rapidly integrate the signal fed thereto. The capacitors 134, 135 and 136 are of different capacities so that the time constants of the integration performed by the amplifier 131 can be adjusted to the time constants of the computer solution. The integrated signal is then inverted by amplifier 132 and fed back to the input of the amplifier 130 through resistor 138. Due to the high gain of the loop so formed, the output of the amplifier 132 rapidly assumes a value equal in magnitude and opposite in polarity to the computer solution signal applied to amplifier 130. As long as the computer solution signal is increasingly negative, the entire circuit 124 acts like an inverting tracking amplifier. However, as soon as the derivitive of the computer solution signal changes sign, the net input signal to the amplifier 130 becomes positive, the output signal thereof becomes negative and diode 133 opens the loop causing amplifier 131 to become a storage amplifier. The amplifier 131 therefore, holds its output signal constant at a level representing the peak of the computer solution signal. This level is maintained either until the end of the compute signal which causes the FET's 128 and 129 to conduct or until a larger negative value is applied to the input of the amplifier 130.

Figure 9:
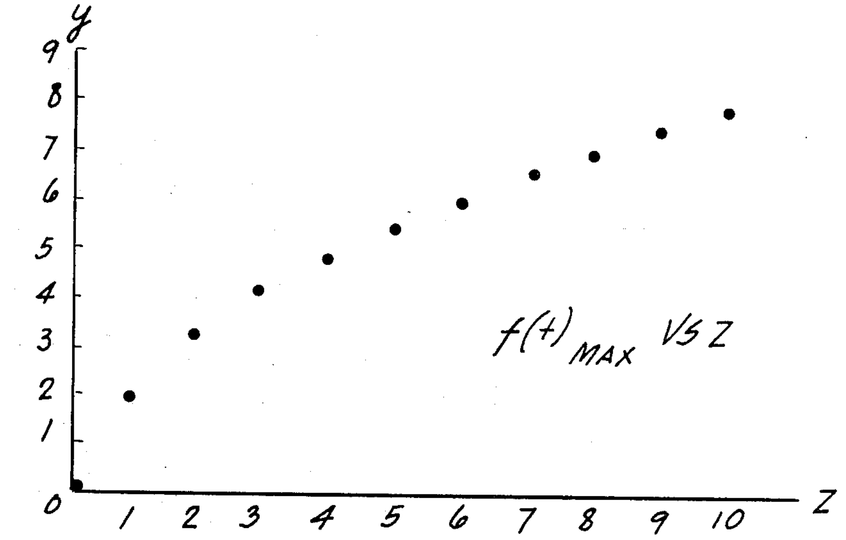

The output of amplifier 132 which represents the peak of the computer solution is applied by means of terminal 140, the $y$ mode select switch 28 in the C position, and the $y$ axis amplifier 30 to the $y$ axis of the CRT 32. The variable resistor 120 in the comparator 115 is adjusted so the comparator 115 produces an output to the $z$ axis amplifier 40 to energize the electron gun 41 of the CRT 32 after the time of the computer solution signal peak while the output of the staircase generator 44 is applied to the $x$ axis of the CRT 32 by means of the $x$ mode select switch 36 in the C position. This causes a series of dots to be displayed on the face of the CRT 32 as shown in FIG. 9 wherein the dots form a curve which is $f(t)_{max}$ vs. $z$.

By adjusting the staircase generator 44 so that more steps are produced, the display means 20 can display either type of cross-plot $f(t)_{t=n}$ vs. $z$ or $f(t)_{max\ or\ min}$ vs. $z$ as a curve of dots which are so closely spaced that a line appears on the CRT 32.

Figures 4, 5:
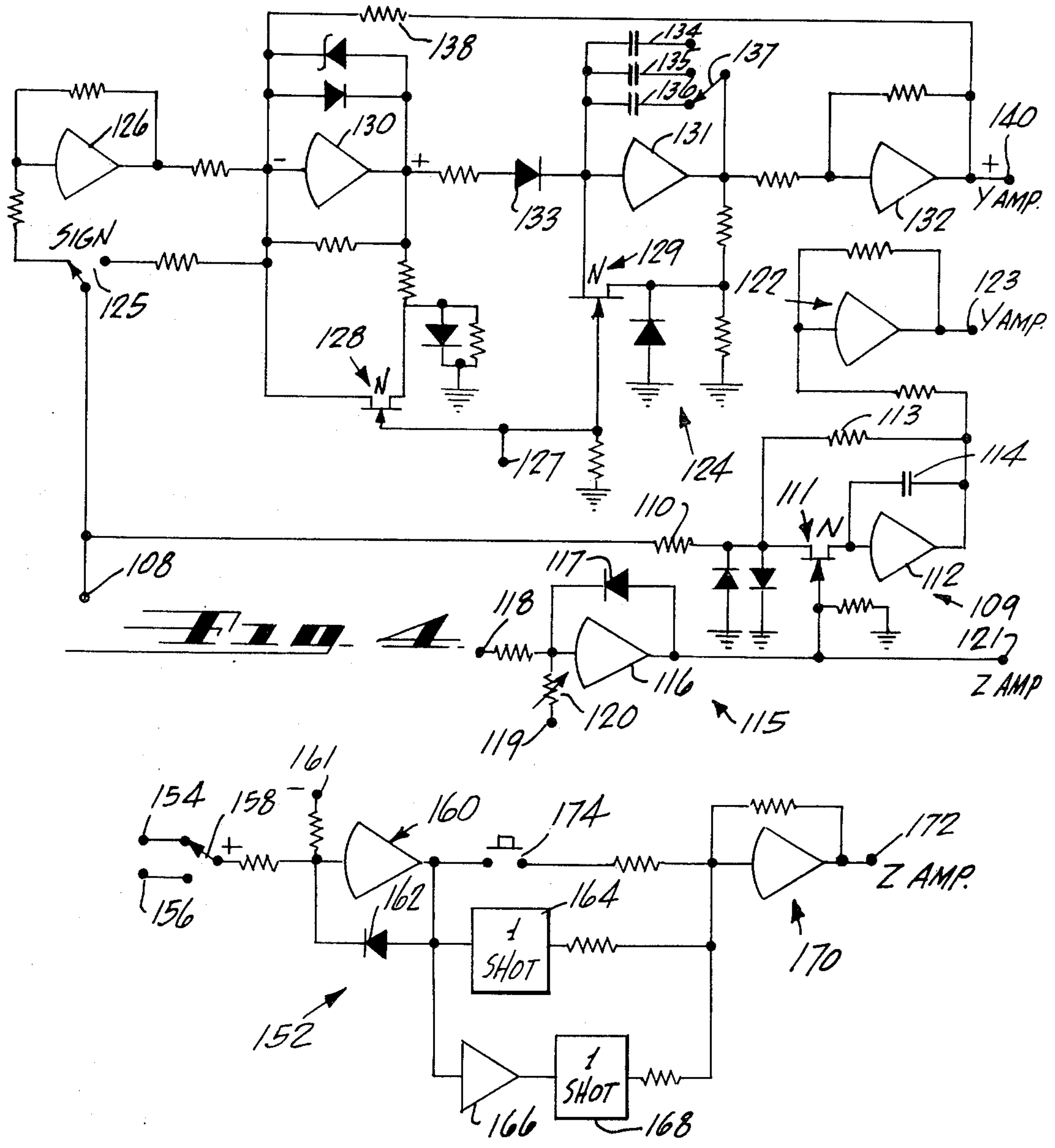
FIG. 4 is a schematic circuit diagram of the track and peak storage means of FIG. 1.
FIG. 5 is a schematic circuit diagram of a comparator of the comparator means of FIG. 1.

When a conformal map display is desired, the output of the staircase generator 44 is applied not only to the computer 22 but to the $y$ axis amplifier 30 through the B connection of the $y$ mode select switch 28. The computer solution is fed through the cross-plot and phase plane amplifier 106 to a series of conformal map comparators 150, an example of which is shown in FIG. 5 as comparator 152. The signal from the cross-plot and phase plane amplifier 106 is fed to terminal 154 of the comparator 152 in an upright condition whereas the same signal is fed in an inverted condition to terminal 156. A switch 158 connects the desired terminal 154 or 156 to the rest of the comparator 152 so that the computer solution output is fed in proper polarity to the comparator 152.

A high gain summer 160 combines the computer solution with a controllable bias level applied at terminal 161. The summer 160 has a diode 162 connected thereacross so that it can produce either a zero output signal or a negative output signal, which it does to saturation when a positive signal is applied to its input. The output of the summer 160 therefore abruptly changes from zero to saturation when the sum of computer solution and the controllable bias level becomes positive. When the sum becomes zero or negative, the summer 160 abruptly ceases its output. These abrupt output signal changes of the summer 160 are applied directly to a one shot circuit 164 and through an inverter 166 to another one shot circuit 168 similar to one shot circuit 164. The one shot circuits alternatively produce pulses of a predetermined duration whenever the output of the summer 160 turns on or off. It therefore can be seen that any time the computer solution output passes through a predetermined level as set by the controllable bias level, an output pulse is produced by one of the one shots. The output pulses of the one shots 164 and 168 are combined in a summer 170 and are fed by means of terminal 172 to the $z$ axis amplifier 40.

The conformal map comparators 150 may include many of the circuits 152 and the settings of the bias voltages in them determines the conformal levels displayed. This is because the output pulses from all of the comparators are fed to the $z$ axis amplifier 40 which briefly energizes the electron gun 41 in the CRT 32 during each one shot pulse to enable a dot to be displayed.

Figure 10:
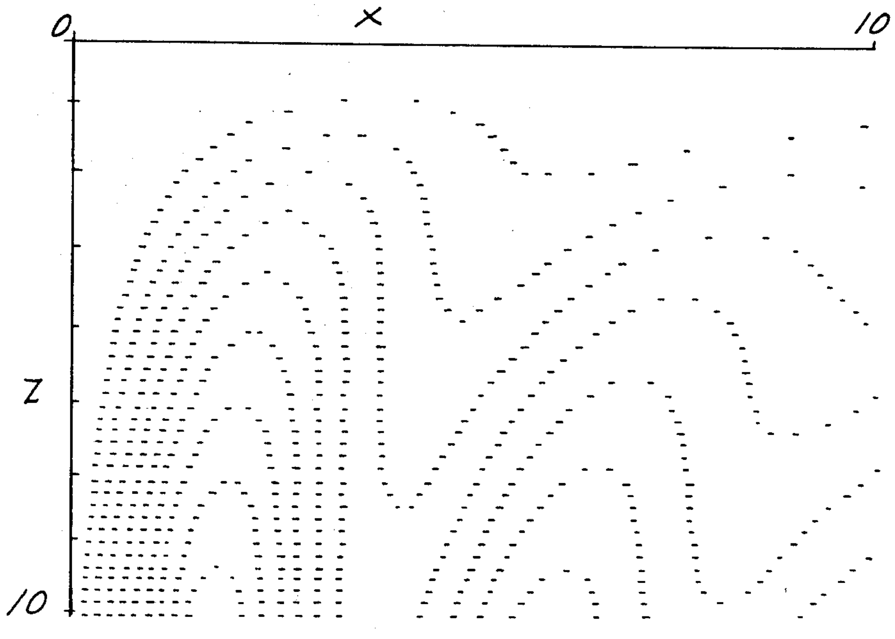

The dots are positioned on the CRT 32 by the inputs thereto from the $y$ and $x$ axis amplifiers 30 and 38. The output of the staircase generator 44 is applied to the $y$ axis through the B connection of the $y$ mode select switch 28 and the $y$ axis amplifier 30 for vertical positioning of the dots. The output of the time base generator 34 is applied to the $x$ axis through the $x$ mode select switch 36 and the $x$ axis amplifier 38 to provide the horizontal sweep. For each solution generated by the computer a horizontal line of the dots appears on the CRT 32. Since the computer continuously recomputes the solution with a new value of $z$ from the staircase generator 44 and since the new value of $z$ shifts the position of the next horizontal line of dots downward, a conformal map is formed on the CRT 32 by the dots. This is illustrated clearly in FIG. 10.

The comparators such as comparator 152 may also include a switch 174 for bypassing the output of the summer 160 around the one shots 164 and 168. The switch 174 is used to adjust the firing level of the comparator 152. Since the one shots 164 and 168 are bypassed when the switch 174 is closed an obvious and easy to see line or plateau is displayed on the CRT 32 whenever the computer solution is above the level set in the comparator 152. The line or plateau of course appears at the level set in the comparator 152, thus allowing easy adjustment thereof.

In all of the aforementioned modes of the display means 20 it should be obvious that in some cases the observability of the display will depend upon the persistency of the CRT 32, that is, the length of time each illumination thereof remains visible. Although in most modern day computers the repetition rate is such that the aforesaid modes of display can be displayed visually, it may be required, especially when computing computer solutions which take a relatively long time, to use a CRT camera to enable the capture of the display in a meaningful form. This is especially true in the cross-plot and conformal mapping modes since in those modes it is usually desirable to have the switches 56, 68, 70, 72 and 78 in the staircase generator 44 set so that the computer recomputes the solution many times. This places the dots on the CRT 32 closer together so the curves are easier to see.

Thus there has been shown and described novel display means which fulfill all the objects and advantages sought therefor. Many changes, modifications, variations, and other uses and applications for the subject display means will, however, become apparent to those skilled in the art after considering this specification and the accompanying drawings. All such changes, modifications, alterations and other uses and applications which do not depart from the spirit and scope of the invention are deemed to be covered by the invention which is limited only by the claims which follow:

What is claimed is:

1. Display means for combination with computer means having an analog portion for generating computer solutions having a predetermined time duration including:

signal generation means for producing an output signal comprised of signal levels of predetermined number and magnitudes, said signal generation means including means for feeding said signal generation means output signal to the computer as an input variable thereto;

display readout means connected to the output of the computer to display the output solutions of the computer generated thereby as a function of the input variable fed thereto by said signal generation means;

means connected to sense a predetermined level of the output solutions of the computer, said sensing means including means to energize said display readout means when said predetermined level is sensed;

means connected to the computer and said display readout means to cause the display of the output solutions of the computer at positions thereon which are proportional to the percentage of the time duration of the computer solutions; and means connected to said signal generation means and said display readout means to cause the display of the output solutions of the computer at positions thereon which are proportional to said signal generation means output signal, so that a conformal map of the computer solutions is displayed by said display readout means with the conformal level thereof being determined by the level sensed by said sensing means.

2. The display means defined in claim 1 wherein said sensing means include:

a plurality of level sensing comparators, each of said comparators including input means for receiving the computer solutions from the computer, means for predeterminently adjusting a comparison signal therein, means for sensing correlation between said computer solutions and said comparison signal, and means for producing an output signal to energize said display readout means wherever said computer solutions and said comparison signal correlate.

3. The display means defined in claim 2 wherein each of said level sensing comparators include means for energizing said display readout means on demand when the computer solution is greater in magnitude than the comparison signal as adjusted therein.

4. Means for displaying a surface defined by the variables $x$, $y$ and $z$ wherein said display means are operatively connected to an analog portion of a computer which is capable of repetitively producing a time varying output signal in which $y$ is proportional to the value of the computer output signal and $x$ is proportional to the time at any point during the computer output signal with respect to a fixed value of $z$, said display means including:

means for generating a plurality of predetermined values of $z$, said generating means including means connected to the computer for synchronizing the generation of the values of $z$ to the repetitive productions of the computer output signal, and output means connected to the computer for feeding a predetermined value of $z$ to the computer during each repetitive production of the computer output signal;

readout means to which the computer output signals which are representative of the surface defined by the variables $x$, $y$, and $z$ are fed, said readout means displaying said computer output signals together so a predetermined display of said surface is produced;

means connected between said generating means and said readout means for feeding predetermined amounts of the $z$ variable to said readout means so that the computer output signals displayed thereby are displayed in relation to the value of the $z$ variable; and means sensitive to predetermined characteristics of the computer output signal, said sensitive means including means for energizing and de-energizing said readout means in response to the predetermined characteristics of the computer output signal.

5. The means for displaying a surface defined in claim 4 wherein said sensitive means include means responsive to predetermined levels of said computer output signals so that a conformal map of said surface is displayed by said readout means.

6. The means for displaying a surface defined in claim 4 wherein said sensitive means include means responsive to predetermined times during each computer output signal so that said surface is displayed by said readout means as points therein at a predetermined value of $x$.

7. The means for displaying a surface defined in claim 4 wherein said sensitive means include means responsive to the peak value of each computer output signal so that said surface is displayed on said readout means as points therein at peak values of $y$ thereof.

8. Display generating means for displaying a surface, which is a function of variables $x$, $y$ and $z$, selectively as a family of curves of $x$ vs. $y$ for values of $z$, as an isometric projection of the surface, as a conformal map of the surface with conformal levels of $y$, as a curve of $y$ vs. $z$ for a selected value of $x$ and as a curve of $y$ vs. $z$ for the peak values of $y$, said display generating means being used in conjunction with an analog computer capable of producing a computer output signal in proportion to $x$ vs. $y$ for discrete values of $z$, said display generating means including:

synchronizing means for interfacing said display generating means to the computer;

input means connected to the computer to selectively feed computer output signals to said display generating means;

a cathode ray tube having an electron gun, a face on which said surface is displayed, a vertical input, a horizontal input, and an electron gun energizing input;

staircase generator means for producing discrete predetermined values of $z$;

means for feeding said discrete generated values of $z$ as an input to the computer;

means for sensing predetermined characteristics of the computer output signals and for producing outputs representative of the predetermined characteristics selectively to said electron gun energizing input of said cathode ray tube;

first selector means for selectively applying the outputs of said input means, said staircase generator means and said sensing means to said vertical input of said cathode ray tube; and second selector means for selectively applying the outputs of said input means and said staircase generator means to said horizontal input of said cathode ray tube.

9. The display generating means defined in claim 8 including time base generating means selectively connected to said horizontal input of said cathode ray tube by said second selector means.

10. The display generating means defined in claim 8 including axis generation means for selectively producing horizontal and vertical axes on said cathode ray tube face by feeding a signal through said second selector means to said horizontal input of said cathode ray tube and by feeding a signal through said input means and said first selector means to said vertical input of said cathode ray tube.

11. Display means for combination with computer means having an analog portion including:

signal generation means for producing an output signal comprised of signal levels of predetermined number and magnitudes, said signal generation means including means for feeding said signal generation means output signal to the computer as an input variable thereto;

display readout means connected to the output of the computer to display the output solutions of the computer generated thereby as a function of the input variable fed thereto by said signal generation means;

said signal generation means also including second output means connected to feed predetermined portions of said signal generation means output signal to said display readout means;

said display readout means also including input means for combining the output solutions of the computer with said predetermined portions of said signal generation means output signal, whereby each successive computer solution is displaced on said display readout means so that the solutions appear as an isometric view of a surface defined in part by said input variable fed to the computer;

ramp signal generating means operatively connected to the computer to generate a ramp signal before each computer solution; and means connected to apply said ramp signal to said display readout to display axes for the computer solution displayed thereon.

12. Display means for combination with computer means having an analog portion including:

signal generation means for producing an output signal comprised of signal levels of predetermined number and magnitudes, said signal generation means including means for feeding said signal generation means output signal to the computer as an input variable thereto;

display readout means connected to the output of the computer to display the output solutions of the computer generated thereby as a function of the input variable fed thereto by said signal generation means;

ramp signal generating means operatively connected to the computer to generate a ramp signal during each computer solution;

means connected to sense an adjustable predetermined level of said ramp signal, said sensing means including means to energize said display readout means when said predetermined level is sensed; and means connected to said signal generation means and said display readout means to cause the display of the output solutions of the computer at positions on said display readout means which are proportional to said signal generation means output signal whereby the levels of the computer solutions at a predetermined time during each solution are displayed.

13. Display means for combination with computer means having an analog portion including:

signal generation means for producing an output signal comprised of signal levels of predetermined number and magnitudes, said signal generation means including means for feeding said signal generation means output signal to the computer as an input variable thereto;

display readout means connected to the output of the computer to display the output solutions of the computer generated thereby as a function of the input variable fed thereto by said signal generation means;

ramp signal generating means operatively connected to the computer to generate a ramp signal during each computer solution;

means connected to sense an adjustable predetermined level of said ramp signal, said sensing means including means to energize said display readout means when said predetermined level is sensed;

means connected to the computer to sense the peak signal condition of each computer solution, said peak sensing means including means to generate a peak output signal to said display readout means in proportion to said peak; and means connected to said signal generation means and said display readout means to cause the display of the peak signals of the output solutions at positions on said display readout means which are proportional to said signal generation means output signal so that when said ramp signal level sensing means are adjusted to sense a ramp signal level occurring in time after said peak is sensed, said display readout means displays a peak history of said computer solutions.

* * * * *